(12) United States Patent
Gatepin et al.

(10) Patent No.: US 6,407,681 B2
(45) Date of Patent: Jun. 18, 2002

(54) QUANTIZATION METHOD FOR BIT RATE TRANSCODING APPLICATIONS

(75) Inventors: Philippe Gatepin, Paris; Guy Normand, Sucy-En-Brie, both of (FR)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/773,160

(22) Filed: Jan. 31, 2001

(30) Foreign Application Priority Data

Feb. 4, 2000 (EP) .............................. 00400317

(51) Int. Cl.[7] .............................. H03M 7/40; H03M 7/46
(52) U.S. Cl. ..................... 341/63; 341/67; 375/240.27
(58) Field of Search .............................. 341/61, 63, 65, 341/67; 348/386, 419; 375/240.03, 240.15, 240.26, 240.27, 240.5, 240.07; 382/268

(56) References Cited

U.S. PATENT DOCUMENTS

| | | | |
|---|---|---|---|
| 5,537,440 A | * 7/1996 | Eyuboglu et al. | 375/245 |
| 5,729,293 A | * 3/1998 | Keesman | 375/240.15 |
| 5,870,146 A | 2/1999 | Zhu | |
| 6,201,844 B1 | * 3/2001 | Bailleul | 375/372 |
| 6,226,328 B1 | * 5/2001 | Assuncao | 375/240.26 |

FOREIGN PATENT DOCUMENTS

| | | |
|---|---|---|
| EP | 0944261 A2 | 3/1999 |
| WO | WO9934602 | 12/1998 |

OTHER PUBLICATIONS

Seamless Concatenation—A 21st Century Dream, M.J.Knee, Snell & Wilcox Limited, United Kingdom, N.D.Wells BBC Research & Development, United Kingdom.

* cited by examiner

Primary Examiner—Patrick Wamsley
(74) Attorney, Agent, or Firm—Russell Gross

(57) ABSTRACT

The present invention relates to a transcoding device comprising partial decoding means (PD) for receiving a primary coded signal (S1) and providing a dequantized signal (IQS) including DCT coefficients ; quantization means (Q) for receiving the dequantized signal and providing a quantized signal (QS) using correction matrices (COR); and partial encoding means (PE) for receiving the quantized signal and providing a secondary coded signal (S2). Such a transcoding device allows the primary signal encoded at a first bit rate to be converted into the secondary signal encoded at a second bit rate lower than the first one while an optimum signal quality is maintained.

6 Claims, 5 Drawing Sheets

$$\begin{bmatrix} 38 & 0 & 0 & -1 & 0 & 1 & 0 & 0 \\ 0 & 2 & 1 & 0 & 0 & -1 & 0 & 0 \\ -2 & -1 & 0 & -1 & 0 & 1 & -1 & 0 \\ -1 & 2 & 0 & 0 & 0 & -1 & 1 & 0 \\ 1 & 0 & -1 & 0 & 0 & 0 & -1 & 0 \\ 0 & -1 & 0 & 0 & 0 & 0 & 1 & 0 \\ 1 & 1 & 0 & 0 & 0 & 0 & 0 & 0 \\ 0 & 0 & 0 & 0 & 0 & 0 & 0 & 0 \end{bmatrix}$$

FIG. 2a $$\begin{bmatrix} 38 & 0 & 0 & -1 & 0 & 0 & 0 & 0 \\ 0 & 1 & 0 & 0 & 0 & 0 & 0 & 0 \\ -1 & 0 & 0 & 0 & 0 & 0 & 0 & 0 \\ -1 & 1 & 0 & 0 & 0 & 0 & 0 & 0 \\ 0 & 0 & -1 & 0 & 0 & 0 & 0 & 0 \\ 0 & -1 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

FIG. 2b $$\begin{bmatrix} 38 & 0 & 0 & -1 & 0 & 1 & 0 & 0 \\ 0 & 1 & 1 & 0 & 0 & -1 & 0 & 0 \\ -1 & -1 & 0 & -1 & 0 & 1 & -1 & 0 \\ -1 & 1 & 0 & 0 & 0 & -1 & 1 & 0 \\ 1 & 0 & -1 & 0 & 0 & 0 & -1 & 0 \\ 0 & -1 & 0 & 0 & 0 & 0 & 1 & 0 \\ 0 & 1 & 0 & 0 & 0 & 0 & 0 & 0 \\ 0 & 0 & 0 & 0 & 0 & 0 & 0 & 0 \end{bmatrix}$$

FIG. 2c $$\frac{1}{64}\begin{bmatrix} 64 & 64 & 64 & 64 & 62 & 50 & 30 & 24 \\ 64 & 64 & 64 & 64 & 50 & 35 & 29 & 22 \\ 64 & 64 & 64 & 64 & 42 & 33 & 28 & 20 \\ 64 & 64 & 64 & 64 & 39 & 31 & 26 & 20 \\ 62 & 50 & 42 & 39 & 36 & 27 & 23 & 18 \\ 50 & 35 & 33 & 31 & 27 & 23 & 18 & 15 \\ 30 & 29 & 28 & 26 & 23 & 18 & 15 & 11 \\ 24 & 22 & 20 & 20 & 18 & 15 & 11 & 8 \end{bmatrix}$$

FIG. 4a $$\frac{1}{64}\begin{bmatrix} 64 & 64 & 64 & 64 & 64 & 64 & 64 & 48 \\ 64 & 64 & 64 & 64 & 64 & 64 & 48 & 48 \\ 64 & 64 & 64 & 64 & 64 & 64 & 48 & 48 \\ 64 & 64 & 64 & 64 & 64 & 48 & 48 & 48 \\ 64 & 64 & 64 & 64 & 48 & 48 & 48 & 48 \\ 64 & 64 & 64 & 48 & 48 & 48 & 48 & 48 \\ 64 & 48 & 48 & 48 & 48 & 48 & 48 & 48 \\ 48 & 48 & 48 & 48 & 48 & 48 & 48 & 48 \end{bmatrix}$$

FIG. 4b

QUANTIZATION METHOD FOR BIT RATE TRANSCODING APPLICATIONS

FIELD OF THE INVENTION

The present invention relates to a method of and a corresponding device for transcoding a primary coded signal previously quantized with a first quantization scale into a secondary coded signal quantized with a second quantization scale, said method of transcoding comprising at least the steps of:

partially decoding the primary coded signal, using the first quantization scale and providing a dequantized signal including DCT coefficients, quantizing the dequantized signal, using quantization matrices and the second quantization scale and providing a quantized signal, encoding the quantized signal so as to obtain the secondary coded signal.

The invention also relates to a corresponding device for carrying out such a method of transcoding.

This invention is particularly relevant for the transcoding of MPEG compressed video signals.

BACKGROUND OF THE INVENTION

Bit rate transcoding is a technique which allows a primary video stream encoded at a bit rate D1 to be converted into a secondary video stream encoded at a bit rate D2 lower than D1, the bit rate reduction being performed in order to meet requirements imposed by the means of transport during broadcasting. A possible method of transcoding is described in the document entitled "Seamless Concatenation—A 21st Century Dream", by M. J. Knee and N. D. Wells, and disclosed at the International Television Symposium (Montreux, Switzerland, Jun. 13–17, 1997). Said document presents a transcoder, which is depicted in FIG. 1 of the present invention. Such a transcoder comprises, in series, a variable length decoder (VLD), an inverse quantizer (IQ), a quantizer (Q), a variable length encoder and a buffer (VLC/BUF), and a rate control device (REG).

Unfortunately, such a transcoding method from a bit rate D1 to a bit rate D2 often leads to a substantial degradation of the picture quality, especially when the transcoded sequence of pictures is compared with the same sequence directly encoded at a bit rate D2, blurring effects or blocking artifacts being far more conspicuous on the transcoded sequence of pictures.

SUMMARY OF THE INVENTION

It is an object of the invention to provide a method of transcoding and a corresponding device which lead to a minimal degradation in picture quality.

To this end, the method of transcoding according to the invention is characterized in that it comprises a quantization step that uses correction matrices in order to cancel undesired DCT coefficients of the dequantized signal.

The use of correction matrices comes from the following observations. The primary signal has been encoded by a video encoder at a high bit rate D1. As a result of this high bit rate, small quantization scales are used, leading to a lot of small DCT coefficients equal to 1 or −1. As a consequence, when quantizing, the encoder does not favor the cancellation of the small DCT coefficients especially in the high frequency domain, as shown in FIG. 2a. If the primary signal is encoded at a bit rate D2 lower than D1, most of the small high frequency DCT coefficients are set to 0, as shown on FIG. 2b, due to the use of higher quantization scales. However, when the primary signal is transcoded from the bit rate D1 to the bit rate D2, most of the small DCT coefficients of the primary coded signal remain '1' or '−1' after the re-quantization process, as shown in FIG. 2c. These coefficients are then undesired since they do not contribute to the picture quality. On the contrary, these coefficients are encoded using the escape coding defined by the MPEG-2 standard, which is bit consuming. For a constant bit rate encoding, the bits really allocated to the picture quality are consequently decreased, resulting in an increase of the quantization scale and leading to a degradation of the picture quality. The aim of the correction matrices is to correct this negative effect, which is due to the rounding process of the re-quantization step.

The method of transcoding according to the invention is also characterized in that the quantization step comprises a sub-step of testing the neighborhood of the DCT coefficients in order to determine if the correction matrices have to be applied or not.

Such a testing sub-step allows the correction matrices to be applied in a more efficient way, leading to an improvement of the quality of the transcoded pictures.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIGS. 2a, 2b and 2c represent three 8×8 DCT blocks corresponding to the same area of a picture respectively encoded at a bit rate D1, encoded at a bit rate D2 and transcoded from a bit rate D1 to a bit rate D2, FIGS. 4a and 4b are two examples of correction matrices respectively used for Intra-coded pictures and Predicted or Bi-directional pictures.

DETAILED DESCRIPTION OF THE INVENTION

A transcoding device allows a primary coded signal (S1) previously encoded with a first quantization scale, hereafter referred to as Q1, to be converted into a secondary coded signal (S2) encoded with a second quantization scale, hereafter referred to as Q2.

Figure 1:
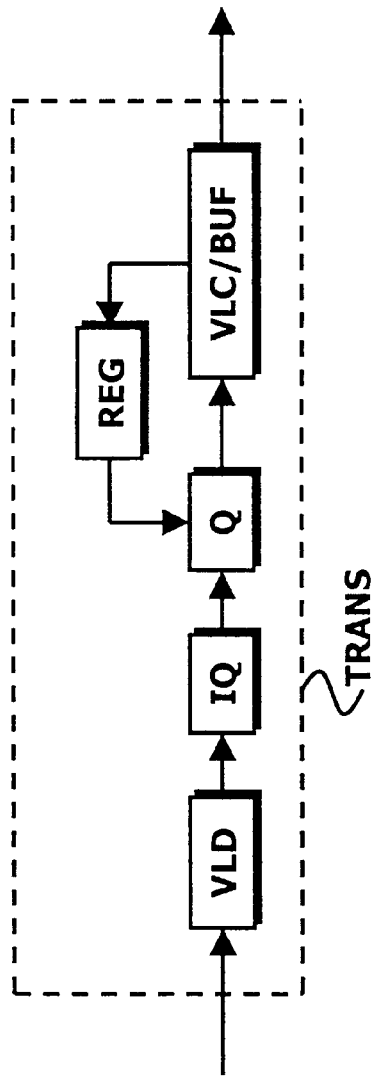
FIG. 1 is a block diagram corresponding to a transcoder according to the background art.
Figure 3:
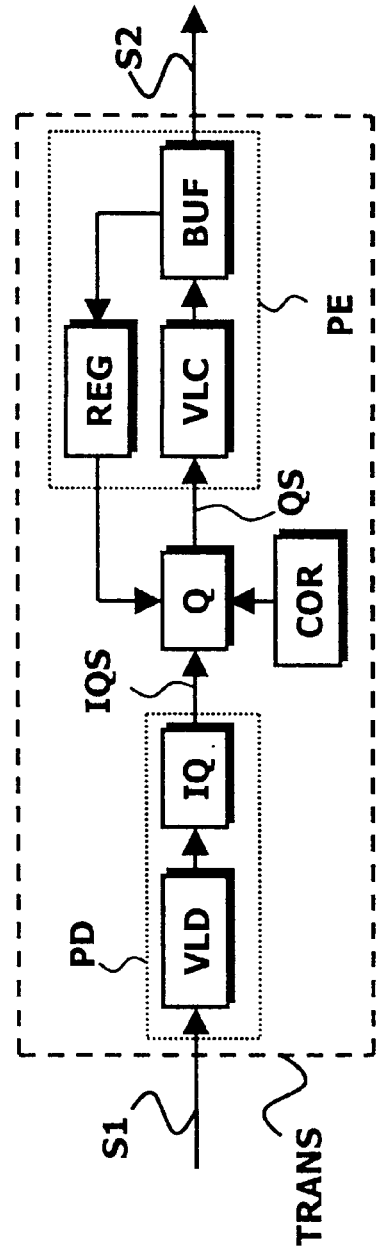
FIG. 3 is a block diagram corresponding to a first embodiment of a transcoding device according to the invention.

Such a transcoding device is depicted in FIG. 3 and comprises at least the following elements:

partial decoding means (PD) for receiving the primary coded signal and providing a dequantized signal (IQS), including DCT coefficients, using the first quantization scale. These partial decoding means comprise in series a variable length decoder (VLD) and an inverse quantizer (IQ).

quantization means (Q) for receiving the dequantized signal and providing a quantized signal (QS) using quantization matrices and the second quantization scale.

partial encoding means (PE) for receiving the quantized signal and providing the secondary coded signal. These partial encoding means comprise, in series, a variable length encoder (VLC), a buffer (BUF) and regulation means (REG). These regulation means calculate the second quantization scale in order to keep a constant picture quality but also to fit the buffer occupancy.

As stated hereinbefore, the present invention aims at improving the quantization means. For that purpose, said quantization means comprises correction means (COR) in order to cancel undesired DCT coefficients of the dequantized signal, the undesired coefficients being the small high frequency DCT coefficients as i*edescribed in the summary of the invention.

The quantization method according to the invention will now be described in the case of an MPEG-2 coded signal including DCT coefficients but it will be apparent to a person skilled in the art that such a method is applicable to any coded signal that has been encoded with a block-based compression method such as, for example, the one described in MPEG-4, H.261 or H.263 standards. Said quantization method comprises at least:

a first processing step applied to the coded signal, using quantization matrices and providing a weighted coded signal, a second processing step applied to the weighted coded signal, using a quantization scale and providing a quantized signal.

These two steps are implemented in a different way for Intra-coded (I) pictures and for Predicted (P) or Bi-directional (B) pictures.

For Intra-coded pictures, the first processing step computes, for each DCT coefficient acI(u,v) of a 8×8 DCT block, a weighted DCT coefficient wacI(u,v) using a weighted coefficient wI(u,v) of a quantization matrix wI:

wacI(u,v)=16×acI(u,v) // wI(u,v)

where: is the division with a rounding to the nearest integer, u and v are integers such as u=1 to 8 and v=1 to 8.

The quantization matrix wI is either the matrix that is defined by the MPEG-2 standard or a matrix defined by a user and downloaded with the Quant_matrix_extension procedure described by said standard in the document "Coding of moving pictures and associated audio, Video, ISO/IEC 13818-2, International Standard.

Then, during the second processing step, a rounding value rounding_val is computed in order to obtain the quantized value QacI(u,v) of the weighted DCT coefficient wacI(u,v):

rounding_val=sign[acI(u,v)]×(p×Q2 // q)

QacI(u,v)=(wacI(u,v)+rounding_val×mat_correction_I(u,v))/(2×Q2)

where: p and q are integers, which are, for example p=3 and q=4, as defined in the Test Model 4.2 "Coded representation of picture and audio information, ISO-IEC/JTC1/SC29/WG11", sign[y] is a function that returns the sign of y, / is the division with a rounding to the lowest integer.

The correction matrix mat_correction_I is defined to reduce the rounding value effect, especially for high frequency DCT coefficients, corresponding to high values of u and v. An example of such a matrix is given in FIG. 4a but it will be obvious to a person skilled in the art that the invention is not limited to the use of such a matrix, the main characteristics of the correction matrix being that its high frequency coefficients are equal to or lower than its low frequency coefficients.

For Predicted or Bi-directional pictures, the first processing step computes, for each DCT coefficient acPB(u,v), a weighted DCT coefficient wacPB(u,v) using a weighted coefficient wPB(u,v) of a quantization matrix wPB:

wacPB(u,v)=16×acPB(u,v) // wPB(u,v)

The quantization matrix wPB is either the matrix that is defined by the MPEG2 standard or a matrix defined by the user and downloaded with the Quant_matrix_extension described by said standard.

The second processing step computes the quantized value QacPB(u,v) of the weighted DCT coefficient wacPB(u,v) as follows:

QacPB(u,v)=wacPB(u,v)×mat_correction_PB(u,v))/(2×Q2)

An example of such a correction matrix mat_correction_PB is given in FIG. 4b but it will be obvious to a person skilled in the art that the invention is not limited to the use of such a matrix for the previously described reasons.

The above described method can be improved by applying the correction matrices as a function of the neighborhood of the DCT coefficients. The criteria used to determine if a coefficient of the correction matrix has to be applied or not is based on the fact that image texture has smooth spatial variations in a local area, so that one can expect that details of the pictures are characterized by non-zero DCT coefficients, though small, in a small frequential neighborhood. In this case, even if an a priori undesired DCT coefficient is observed (typically a very small DCT coefficient in the HF), no correction will be applied to this DCT coefficient since its neighbors are constituted by non-zero values. On the contrary, if an isolated undesired DCT coefficient is observed, a correction measure is applied, by using the correction matrices. This second embodiment is implemented as follows:

if (Nb_null_DCT_coeff(u,v)>Nb_null_DCT_coeff_min)

then apply mat_correction_I(u,v) or mat_correction_PB(u,v)

else do not modify the DCT coefficient where:

Nb_null_DCT_coeff(u,v) is the number of DCT coefficients equal to 0 in a neighborhood defined around the position (u,v), for example Nb_null_DCT_coeff_min=2 according to the settings of the second embodiment, S(u,v) defines a set of positions around the position (u,v), for example S(u,j)={(u−1,v), (u+1,v), (u,v−1), (u,v+1)} according to the settings of the second embodiment.

The above described quantization methods are more particularly intended to be integrated in a transcoding process. However, they can be also integrated in an encoding process.

Figure 5:
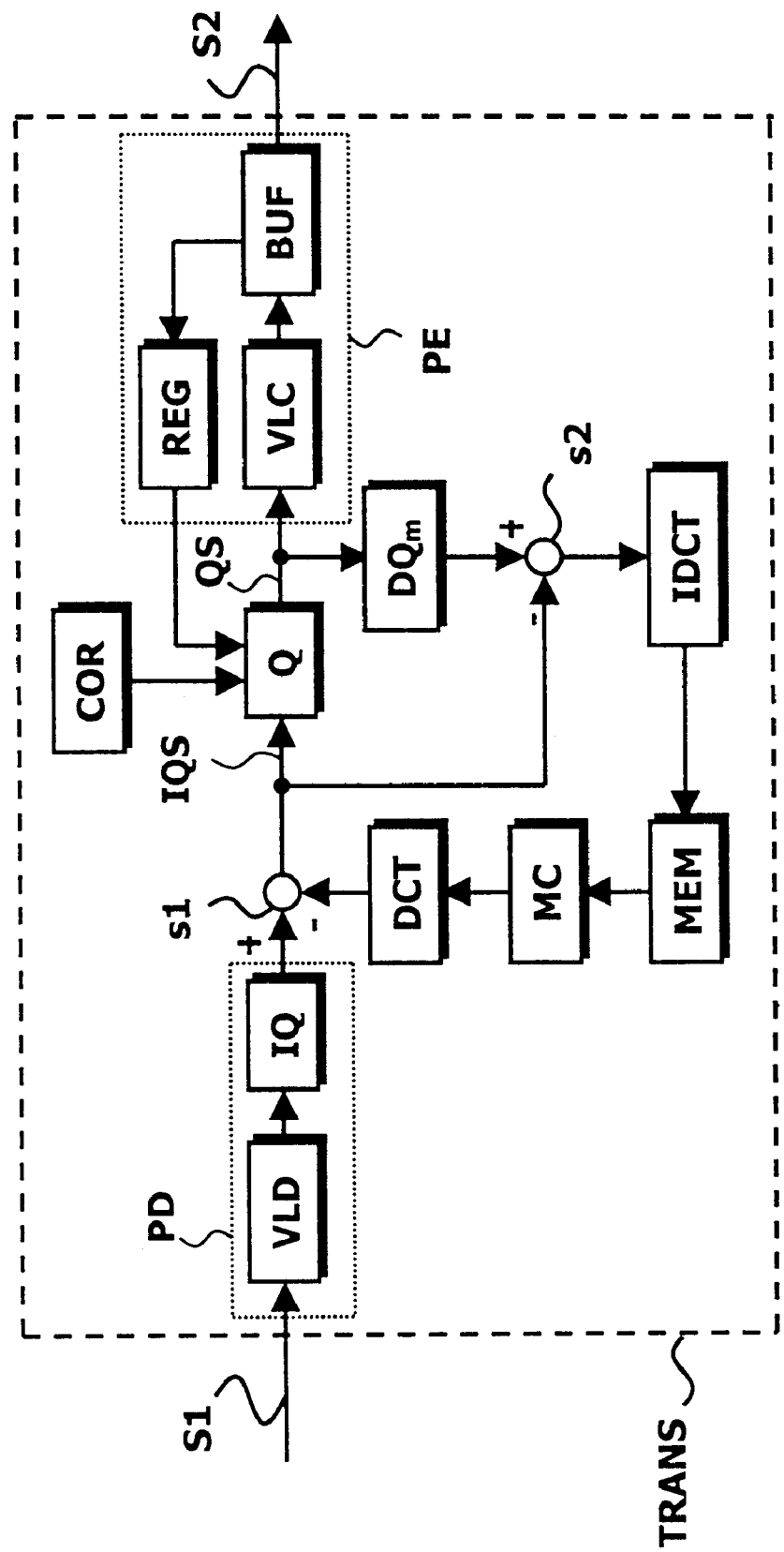
FIG. 5 is a block diagram corresponding to a second embodiment of a transcoding device according to the invention and comprising means for motion compensation.
Figure 6:
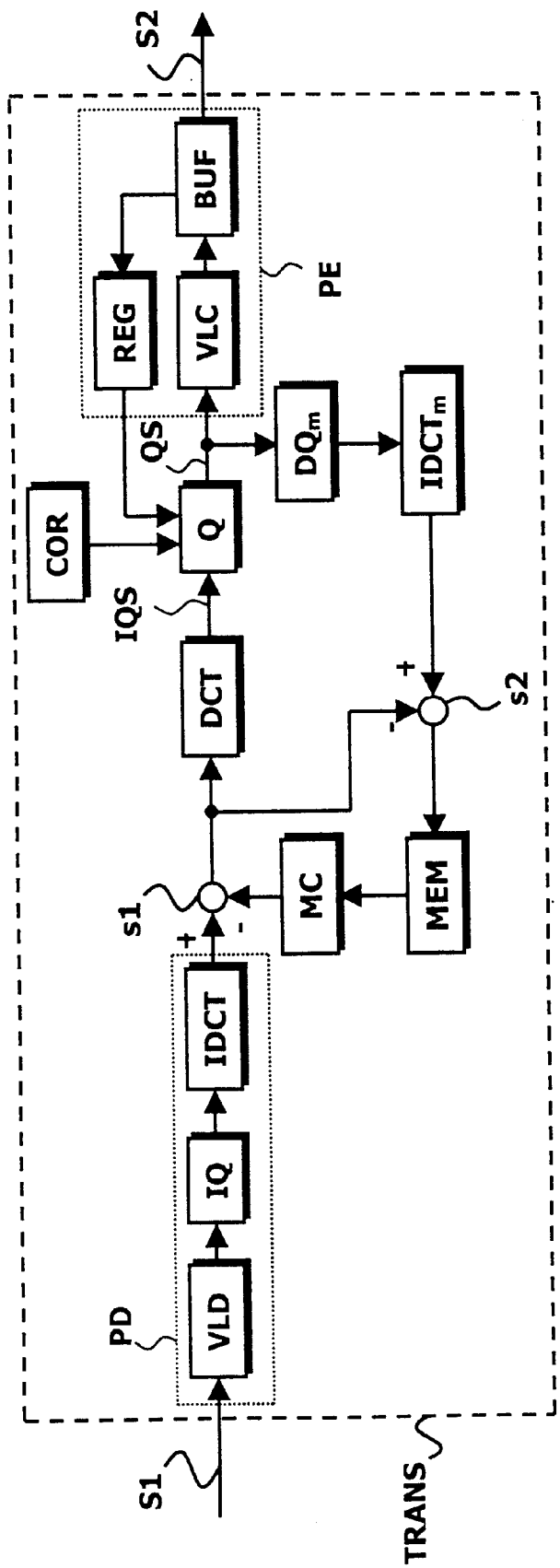
FIG. 6 is a block diagram corresponding to a third embodiment of a transcoding device according to the invention and comprising improved means for motion compensation.

The transcoder of FIG. 3 is a simple one that contains mainly a re-quantization step. FIGS. 5 and 6 show more complex transcoders using means for motion compensation. Such motion compensation means are used to correct the error drift on P/B pictures that occurs when using only re-quantization.

In FIG. 5, the transcoder comprises:

- a partial decoding channel (PD) for receiving the primary coded signal which is composed of a Variable Length Decoding block VLD connected in series with a dequantization block IQ,
- an encoding-decoding channel comprising a quantization block Q using correction means COR and connected in series with a Variable Length Coding block VLC, the output of the quantization block being also connected to an extra dequantization block $DQ_m$,
- a partial encoding channel (PE) for receiving the quantized signal (QS) from the quantization block and comprising, in series, a variable length encoder (VLC), a buffer (BUF) and regulation means (REG), the buffer providing the secondary coded signal and the regulation means providing a quantization scale to the quantization block,
- an interface sub-assembly, connected between the decoding channel and the encoding-decoding channel, and comprising:
  - a first subtractor s1, whose positive input receives the output of the decoding channel and whose output provides a dequantized signal (IQS) to the input of the Q block,
  - a second subtractor s2, whose positive input receives the output of the $DQ_m$ block and whose negative input is connected to the output of the first subtractor,
  - an Inverse Discrete Cosine Transform block IDCT, a frame memory MEM, a motion compensation block MC and a Discrete Cosine Transform block DCT, all connected in series between the output of the second subtractor and the negative input of the first subtractor, the motion compensation being performed using motion vectors representing the motion of each macro-block of the current picture with respect to the corresponding macro-block of a previous picture in the transmission order.

The transcoder in FIG. 6 is more sophisticated and comprises:

- a partial decoding channel (PD) composed of a Variable Length Decoding block VLD connected in series with a dequantization block DQ and an Inverse Discrete Cosine Transform block IDCT,
- an encoding-decoding channel comprising a Discrete Cosine Transform block DCT for providing a dequantized signal (IQS) to a quantization block Q using corrections means COR, and a Variable Length Coding block VLC, the output of the quantization block being also connected to an extra dequantization block $DQ_m$ followed by an extra Inverse Discrete Cosine Transform block $IDCT_m$,
- a partial encoding channel (PE) as described with reference to FIG. 5,
- an interface sub-assembly, connected between the decoding channel and the encoding-decoding channel, and comprising:
  - a first subtractor s1, whose positive input receives the output of the decoding channel and whose output is connected to the input of the DCT block,
  - a second subtractor s2, whose positive input receives the ouput of the $IDCT_m$ block and whose negative input is connected to the output of the first subtractor,
  - a frame memory MEM and a motion compensation block MC connected in series between the output of the second subtractor and the negative input of the first subtractor.

It will be obivious that the use of the verb "to comprise" and its conjugations does not exclude the presence of any other steps or elements besides those defined in any

What is claimed is:

1. A method of transcoding a primary coded signal (S1) previously quantized with a first quantization scale into a secondary coded signal (S2) quantized with a second quantization scale, said method of transcoding comprising at least the steps of:

partially decoding the primary coded signal, using the first quantization scale and providing a dequantized signal (IQS) including DCT coefficients, quantizing the dequantized signal, using quantization matrices and the second quantization scale and providing a quantized signal (QS), encoding the quantized signal so as to obtain the secondary coded signal, characterized in that said quantization step uses correction matrices in order to cancel undesired DCT coefficients of the dequantized signal.

2. A method of transcoding as claimed in claim 1, characterized in that the quantization step comprises a sub-step of testing the neighborhood of the DCT coefficients in order to determine if the correction matrices have to be applied or not.

3. A computer program product for a transcoding device that comprises a set of instructions, which, when loaded into said transcoding device, causes the transcoding device to carry out the method as claimed in claim 1 or 2.

4. A transcoding device for converting a primary coded signal (S1) previously quantized with a first quantization scale into a secondary coded signal (S2) quantized with a second quantization scale and comprising at least:

partial decoding means (PD) for receiving the primary coded signal and providing a dequantized signal (IQS) including DCT coefficients, using the first quantization scale, quantization means (Q) for receiving the dequantized signal and providing a quantized signal (QS) using quantization matrices and the second quantization scale, partial encoding means (PE) for receiving the quantized signal and providing the secondary coded signal, characterized in that said quantization means comprises correction means in order to cancel undesired DCT coefficients of the dequantized signal.

5. A method for the quantization of a coded signal including DCT coefficients, said quantization method comprising at least:

a first processing step applied to the coded signal, using quantization matrices and providing a weighted coded signal, a second processing step applied to the weighted coded signal, using a quantization scale and providing a quantized signal,characterized in that said second processing step uses correction matrices in order to cancel undesired DCT coefficients of the coded signal.

6. A quantization method as claimed in claim 5 characterized in that it comprises a step of testing the neighborhood of the DCT coefficients in order to determine if the correction matrices have to be applied or not.

* * * * *